Dec. 3, 1940.  L. J. SCHLITZER  2,223,968
EYE SET FOR ARTIFICIAL FIGURES
Filed April 27, 1940
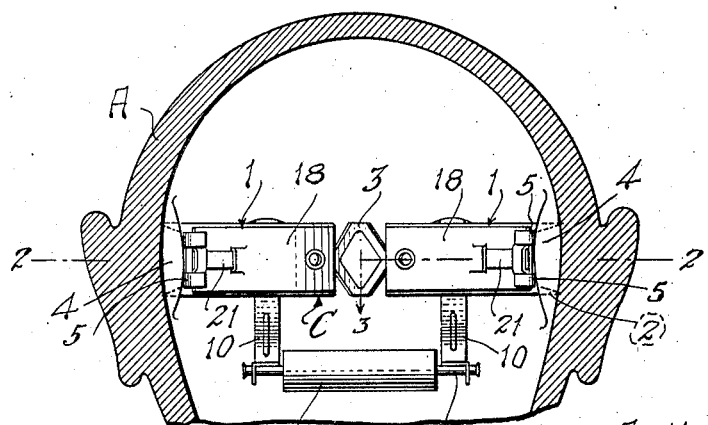
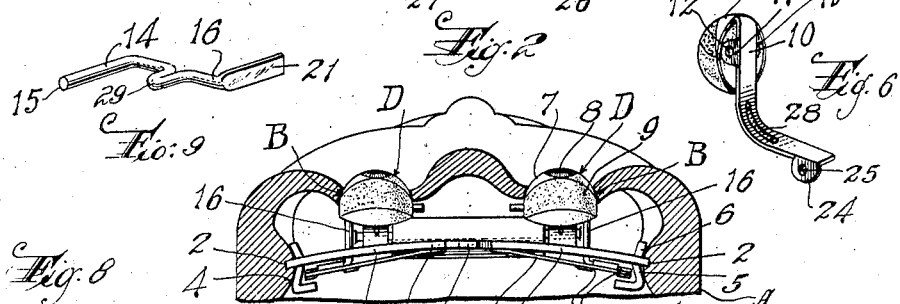
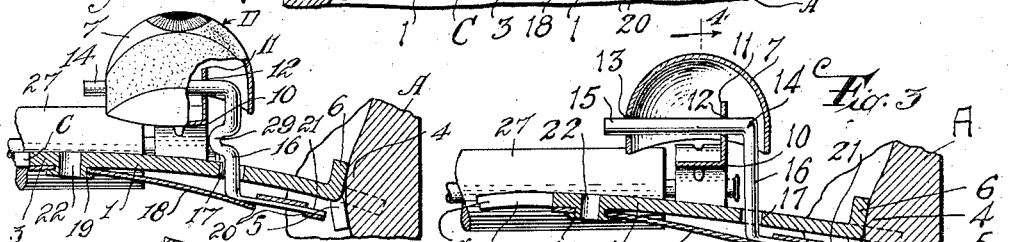
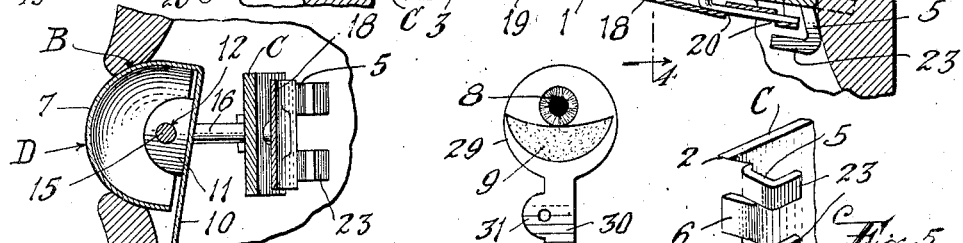
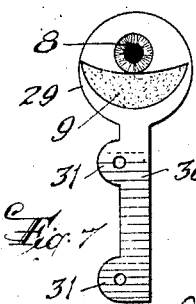
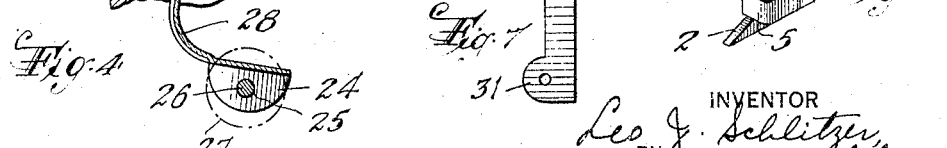
INVENTOR
Leo J. Schlitzer
BY
Harry B. Cook,
ATTORNEY Patented Dec. 3, 1940

2,223,968

UNITED STATES PATENT OFFICE 2,223,968

EYE SET FOR ARTIFICIAL FIGURES

Leo J. Schlitzer, New York, N. Y., assignor of one-half to Joseph A. Taferner, New York, N. Y.

Application April 27, 1940, Serial No. 332,025

9 Claims. (Cl. 46—169)

This invention relates in general to eye sets for artificial figures such as dolls, which include eye members that are mounted on a supporting means or carrier which is secured in the head of, for example, a doll adjacent the eye openings, so that the eye members rotate in the eye openings to simulate natural movement of the eyes as in opening and closing thereof.

The eye sockets in different doll heads frequently have different relations to each other, sometimes being spaced apart different distances and in other cases being slightly out of horizontal alinement in the head; and much time, trouble and expense are required to properly adjust the eye sets in the heads. These difficulties are especially prevalent in eye sets which have the two eye members mounted on a common pivot rod. While eye sets have been proposed to overcome such difficulties, they are either too expensive, or are unreliable in operation or have additional inherent disadvantages or objectionable features of structure.

One object of my invention is to provide an eye of the general character described that shall overcome the above mentioned difficulties and objections and shall be simple, inexpensive, reliable and durable.

Another object is to provide an eye set that shall include novel and improved construction and combination of a support or carrier to be directly engaged with and mounted in a doll head, and individual or separate mountings of the eye members on said support, whereby each eye member may automatically adjust itself relatively to said support and the eye socket of the head as the support is mounted in the head.

Further objects are to provide novel and improved means for individually mounting the eye members on said support or carrier for pivotal movement to simulate opening and closing and for lateral movement in directions parallel to the support and in directions toward and away from the support, to permit the eye members to seat accurately in the respective eye sockets; and to provide a novel and improved combination of both eye members and a common counterweight or pendulum therefor to cause gravitational pivotal movement of the eye members.

Another object is to provide such an eye set which shall include novel and improved means for yieldingly influencing and holding each eye member in its eye socket in the head to ensure against jamming of the eye member in the eye socket and accidental displacement of the eye member from the socket.

Other objects are to provide an eye set including a support comprising a single piece of metal having prongs at its ends and its intermediate portion extensible to embed the prongs in the walls of a doll head, in combination with a doll head having inner convex surfaces on its walls to receive said prongs and facilitate mounting and holding said support in proper position; and to obtain other advantages and results as will be brought out by the following description when read in conjunction with the accompanying drawing in which Figure 1 is a rear elevational view of an eye set embodying my invention, showing it in a doll head which is illustrated in vertical section.

Figure 2 is a top plan view of the eye set mounted in the doll head which is shown in horizontal section on the line 2—2 of Figure 1.

Figure 3 is an enlarged fragmentary horizontal sectional view, on the line 3—2 of Figure 1.

Figure 4 is a transverse vertical sectional view on the line 4—4 of Figure 3.

Figure 5 is a fragmentary perspective view of one end of the support.

Figure 6 is a detached rear perspective view of one of the eye members.

Figure 7 is a plan view of a blank for one of the eye members, from which the eye member is formed.

Figure 8 is a view similar to Figure 3 showing a modification of the pivot rods and with the eye member illustrated in top plan, and Figure 9 is a detached perspective view of a modification of one of the pivot rods.

Specifically describing the illustrated embodiment of the invention the reference character A designates a doll head of known construction which is formed of penetrable material and has the usual eye sockets B in the face portion thereof.

The eye set includes a support C that has end sections 1 formed with integral prongs 2 and relatively movable to be driven into and embedded in opposite side walls in the doll head A. More specifically, the support includes a single strip of ductile metal having an intermediate portion 3 integrally connected to the end sections 1 and longitudinally extensible by forces exerted on the two end sections tending to separate them, the support initially having an overall length less than the distance between the opposite side walls of the head and being secured in the head by forcing the end sections 1 apart so as to drive the prongs 2 into the penetrable material of the head.

To provide a stable seat for the support on the walls of the head, the head is formed with inner protuberances 4 convexly curved in horizontal and vertical planes, while the end sections 1 of the support are formed with lugs 5 and 6 between and inwardly of the extremities of the prongs 2 and projecting from opposite sides of the support. As shown, there is a lug 5 adjacent each prong projecting from one side of the support and a lug 6 between the lugs 5 projecting from the opposite side of the support. These lugs conform more or less to the convex curvature of the portions 4 of the head as shown in Figures 1 and 3 so as to firmly hold the support against both vertical and horizontal movement in the head and also limit the extent of penetration of the prongs 2 into the walls of the head.

An eye member D is provided for each eye socket B, and separate means is provided for mounting each eye member on the support C. As shown, each eye member comprises a substantially hemispherical shell 7 of sheet metal having the representation 8 of a pupil and iris and another portion 9 to represent an eyelid. An integral arm 10 extends from the edge of the eye member and diametrically across the eye member and is provided with a laterally projecting ear 11 extending into the shell and formed with an opening 12 in register or alinement with an opening 13 in one side of the shell and on a diametral line thereof.

Each mounting means for an eye member includes a pivot rod 14 having angularly related arms 15 and 16 one of which, in the present instance the arm 15, passes through the openings 12 and 13 for pivotally mounting the eye member on the pivot rod. The other arm 16 of the pivot rod passes loosely through an opening 17 in one end section of the support C and is connected to a spring 18 for yieldingly permitting movement of the corresponding eye member toward and from the support. As shown, the eye member is mounted at one side of the support and the spring 18 is a leaf spring having one end connected as by rivets 19 to the other side of the support, and its other end formed with slits 20 through which the flattened end portion 21 of the corresponding pivot rod is inserted. It will be observed that to insert the portion 21 of the pivot rod through the slits, portions of the spring at opposite sides of the slits are displaced, and after insertion of the end portion 21, the portions of the spring at opposite sides of the slit are tightly pressed around the portion 21 of the pivot rod to rigidly secure the pivot rod on the spring.

Conveniently, the riveting 19 may be effected by metal from the support C displaced by punching a hole 22 through the support, as clearly shown in Figure 3; although any other suitable means may be provided for securing the spring on the support.

To limit swinging movement of the free end of the spring 18, the extremities of the lugs 5 are returned as at 23 so as to overlie the end of the spring in spaced relation thereto as shown in Figure 3. Instead of the returned ends 23 on the lugs 5, I may provide a lateral projection 29, such as a crimp, on the arm 16 of the pivot rod to abut the support C for limiting movement of the eye member toward the support.

The arms 10 of the eye members project beyond the shells 7 and have other ears 24 provided with openings 25 in which the ends 26 of a counterweight 27 are loosely fitted. In this manner, the counterweight 27 is common to both eye members for gravitationally rotating them about the arms 15 of the respective pivot rods. To rigidify the arms 10, ribs 28 may be stamped therein.

It will be observed that each eye member may move independently of the other longitudinally of the corresponding pivot arm 15, and also each eye member may move yieldingly toward and from the support independent of the other eye member, while both eyes may be pivotally swung on their respective pivot arms 15 simultaneously by the counterweight 27.

In assembling the eye set in a doll head, the eye members are mounted on the support, after which the support is secured in the doll head by forcing the end sections 1 apart to drive the prongs 2 into the walls of the head as above described. During this operation the eye members D may individually adjust themselves to their respective sockets both to compensate for the distance between the eye sockets, variations in distances between the support C and the eye sockets and mis-alinement of the eye sockets horizontally of the head. Upon tilting of the doll head the eye members will swing about their respective pivots in the respective sockets under gravitational influence on the counterweight 27 to simulate opening and closing of the eyes as known in the art, and at the same time the springs 18 will yieldingly hold the eye members in their sockets.

The eye members may be formed in any manner desired, but preferably consist of a single sheet of material as shown in Figure 8. This sheet is stamped to provide a circular portion 29 to form the eye shell upon which the representations 8 and 9 are printed, the circular portion being integral with a lateral extension 30 which forms the arm 10 of the eye member and has lateral projections 31 to form the ears 11 and 24. The portion 29 is pressed by dies into approximately hemispherical form, the projections 31 are bent perpendicularly to the extension 30, and the extension 30 is bent diametrically of the hemispheric shell, to complete the eye member.

Various modifications and changes may be made in the details of structure of the eye set without departing from the spirit or scope of the invention.

Having thus described my invention, what I claim is:

1. An eye set including a support comprising a single strip of ductile metal having a longitudinally extensible portion intermediate end sections which are formed with integral prongs to be embedded in opposite walls of a doll head upon extension of said intermediate portion, a pair of eye members, a mounting means for pivotally securing one eye member on one of said end sections of the strip, and a second mounting means for pivotally securing the other eye member on the other said end section, said two mounting means being separate from and independent of each other.

2. The eye set described in claim 1 wherein each said mounting means includes a rod having two angularly related arms on one of which the corresponding eye member is pivoted, and a leaf spring secured at one end on the side of said support opposite the eye member, and said support having transverse openings through each of which the other arm of one said rod is slidable and connected to the free end of the corresponding leaf spring.

3. In an eye set, a support to be mounted in a doll head, a pair of eye members, a pivot rod for each eye member having two angularly related arms upon one of which the corresponding eye member is pivotally mounted, and means mounting the other arm of each pivot rod on said support to permit movement of the eye member toward and from said support, including a spring for yieldingly resisting movement of said eye member toward said support.

4. In an eye set, a support to be mounted in a doll head, a pair of eye members, a pivot rod for each eye member having two angularly related arms upon one of which the corresponding eye member is pivotally mounted, said support having a transverse opening therethrough for each pivot rod in which the other arm of the corresponding pivot rod is slidable, and spring means on said support to which the second-mentioned arms of said pivot rods are connected to yieldingly permit movement of said eye members toward and from said support.

5. The combination of a doll head having eye openings in the front thereof and protuberances on the inner sides of opposite side walls of the head convexly curved in horizontal and vertical planes, and an eye set including a support having spaced integral prongs at its ends embedded in said convexly curved protuberances, lugs between and inwardly of the extremities of said prongs and one adjacent each prong projecting from one side of said support, and another stop lug between the first-mentioned lugs and projecting from the other side of the support, said lugs and said convex protuberances of the doll head providing a stable seat for the ends of said support upon the walls of the doll head.

6. An eye member for dolls including a hemispherical sheet metal shell having an opening therethrough on a diametral line thereof and an arm extending integrally from the edge thereof from a point intermediate the length of said diametral line and diametrically across said shell transversely of said diametral line, said arm having a pivot ear disposed within said shell and formed with an opening, said openings of the shell and said ear being adapted to receive a pivot rod to pivotally mount said eye member.

7. The eye set described in claim 4 wherein the second-mentioned arm of each pivot rod has a lateral projection between said support and the first-mentioned arm to abut said support for limiting movement of said eye members toward said support.

8. The eye set described in claim 1 wherein each said separate means includes a rod having two angularly related arms on one of which the corresponding eye member is pivoted, and a leaf spring secured at one end on the side of said support opposite the eye member, and said support has transverse openings through each of which the other arm of one said rod is slidable and connected to the free end of the corresponding leaf spring, and with the addition of a lateral projection on the second-mentioned arm of each pivot rod between said support and the first-mentioned arm to abut said support for limiting movement of said eye members toward said support.

9. A doll head having a face portion with eye sockets and opposite side wall portions each formed interiorly with a protuberance of penetrable material convexly curved in horizontal and vertical planes disposed adjacent one eye socket and opposite the protuberance on the other side wall, said protuberances being adapted to be penetrated by prongs of a support for an eye set for attaching the support to the head.

LEO J. SCHLITZER.